(12) United States Patent
Rune et al.

(10) Patent No.: US 11,211,983 B2
(45) Date of Patent: Dec. 28, 2021

(54) RESOURCE ALLOCATION FOR BEAM SWEEP

(71) Applicant: Telefonaktiebolaget LM Ericsson (publ), Stockholm (SE)

(72) Inventors: Johan Rune, Lidingö (SE); Claes-Göran Persson, Mjölby (SE); Jianwei Zhang, Solna (SE); Andres Reial, Malmö (SE); Robert Baldemair, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/982,874

(22) PCT Filed: Apr. 18, 2019

(86) PCT No.: PCT/EP2019/060149
§ 371 (c)(1),
(2) Date: Sep. 21, 2020

(87) PCT Pub. No.: WO2019/202106
PCT Pub. Date: Oct. 24, 2019

(65) Prior Publication Data
US 2021/0006313 A1    Jan. 7, 2021

Related U.S. Application Data

(60) Provisional application No. 62/660,026, filed on Apr. 19, 2018.

(51) Int. Cl.
*H04B 7/06*    (2006.01)
*H01Q 3/24*    (2006.01)
(Continued)

(52) U.S. Cl.
CPC ............. *H04B 7/0617* (2013.01); *H01Q 3/24* (2013.01); *H04B 7/0695* (2013.01); *H04B 7/088* (2013.01);
(Continued)

(58) Field of Classification Search
CPC ... H04L 5/0053; H04L 5/0094; H04L 5/0048; H04L 5/0007; H04L 5/0044;
(Continued)

(56) References Cited

U.S. PATENT DOCUMENTS

2017/0367046 A1    12/2017  Papasakellariou
2018/0241452 A1*    8/2018  Akkarakaran ........ H04L 5/0048
(Continued)

FOREIGN PATENT DOCUMENTS

WO    2018064358 A1    4/2018

OTHER PUBLICATIONS

PCT International Search Report and Written Opinion dated Aug. 5, 2019 for International Application No. PCT/EP2019/060149, 11 pages.

*Primary Examiner* — Vineeta S Panwalkar
(74) *Attorney, Agent, or Firm* — Sage Patent Group

(57) ABSTRACT

A method, system and apparatus are disclosed. In one example, a network node configured for performing dual beam sweep, the dual beam sweep including a physical downlink control channel (PDCCH) beam sweep and a corresponding physical downlink shared channel (PDSCH) beam sweep that are separated in time to each other. The network node is configured to, and/or including a radio interface and/or including processing circuitry configured to: configured to: indicate, in a PDCCH transmission within the PDCCH beam sweep, a time domain resource allocation for the corresponding PDSCH beam, the time domain resource allocation corresponding to an offset in time slots
(Continued)

between the PDCCH beam and the corresponding PDSCH beam, the offset being one of a plurality of offsets that can be indicated for the corresponding PDSCH beam; and perform the dual beam sweep using at least in part the indication.

20 Claims, 6 Drawing Sheets

(51) Int. Cl.
  *H04B 7/08* (2006.01)
  *H04L 5/00* (2006.01)
  *H04W 72/04* (2009.01)

(52) U.S. Cl.
  CPC .......... *H04L 5/0023* (2013.01); *H04L 5/0044* (2013.01); *H04W 72/0406* (2013.01)

(58) Field of Classification Search
  CPC ... H04L 5/0023; H04L 5/0055; H04L 5/0091; H04L 1/1861; H04L 5/14; H04L 1/1896; H04L 5/0064; H04L 1/0038; H04L 1/1607; H04L 5/0092; H04L 5/0082; H04B 7/0617; H04B 7/0695; H04B 7/088; H04B 7/0413; H01Q 3/24; H04W 72/0406; H04W 72/046; H04W 16/28; H04W 68/00; H04W 72/0446
  See application file for complete search history.

(56) References Cited

U.S. PATENT DOCUMENTS

2018/0367374 A1* 12/2018 Liu ....................... H04L 5/0053
2019/0089443 A1*  3/2019 Malik .................. H04B 7/0617
2020/0037274 A1*  1/2020 Pan ....................... H04W 16/28

* cited by examiner

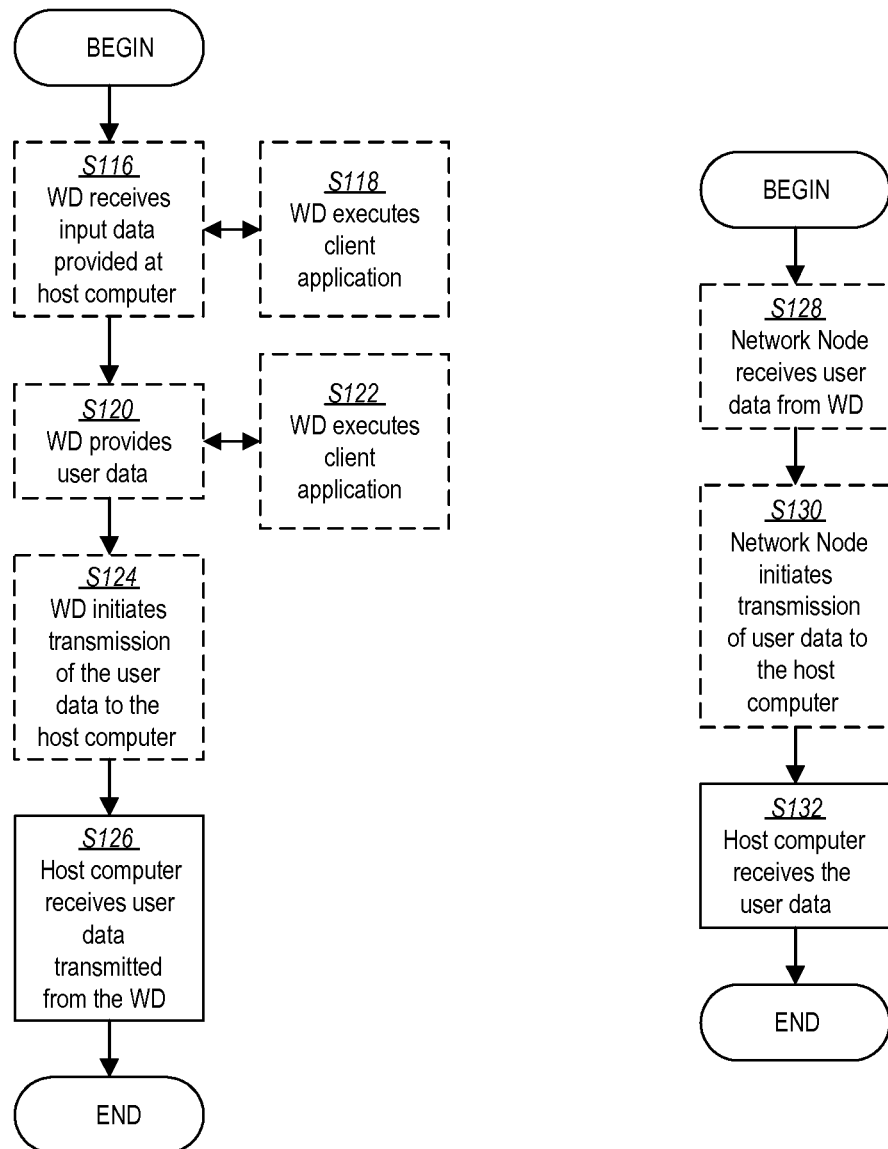

RESOURCE ALLOCATION FOR BEAM SWEEP

CROSS-REFERENCE TO RELATED APPLICATIONS

This application is a 35 U.S.C. § 371 national stage application for International Application No. PCT/EP2019/060149, entitled "RESOURCE ALLOCATION FOR BEAM SWEEP", filed on Apr. 18, 2019, which claims priority to U.S. Provisional Patent Application No. 62/660,026, filed on Apr. 19, 2018, the disclosures and contents of which are hereby incorporated by reference in their entireties.

TECHNICAL FIELD

The present disclosure relates to wireless communications, and in particular, to scheduling Physical Downlink Shared Channel (PDSCH) via a beam sweep Physical Downlink Control Channel (PDCCH).

BACKGROUND

A property of Fifth Generation (5G) wireless communication systems (e.g., New Radio (NR), a Third Generation Partnership Project (3GPP) based standard) is the usage of high carrier frequencies, e.g., in the range 6-100 GHz. For such a high frequency spectrum, the atmospheric, penetration and diffraction attenuation properties of the signals can be much worse than for lower frequency spectrum. In addition, the receiver antenna aperture, as a metric describing an effective receiver antenna area that collects the electromagnetic energy from an incoming electromagnetic wave, may be inversely proportional to the frequency, i.e., the link budget may be worse for the same link distance even in a free space scenario such as if omnidirectional receive and transmit antennas are used. Beamforming may be used to compensate for the loss of link budget in high frequency spectrum. Beamforming may be a factor when communicating with wireless device's with poor receivers, e.g., low cost/low complexity wireless devices. Other methods for improving the link budget include repetition of the transmissions (e.g., to allow wide beam or omnidirectional transmission) or the use of Single Frequency Network (SFN) transmission from multiple Transmission/Reception Points (TRPs) in the same or different cells.

Due to the above described properties, in the high frequency bands, many downlink signals, such as synchronization signals, system information, and paging, which need to cover a certain area (i.e., not just targeting a single wireless device with known location/direction), e.g., a cell, are expected to be transmitted using beam sweeping, i.e., transmitting the signal in one beam at a time, sequentially changing the direction and coverage area of the beam until the entire intended coverage area, e.g., the cell, has been covered by the transmission. The number of beams that may be used for such a beam sweep depends on the carrier frequency. The higher frequency, the greater the number of beams. For instance, in the frequency range known as FR2, i.e., 24250-52600 MHz, then 3GPP (a standardization organization) has specified that a beam sweep may contain up to 64 beams.

Paging is a function in a mobile telecommunications system. It may be used by the network to contact a wireless device such as to transmit downlink data to the wireless device, once the wireless device has responded to the page. Paging can also be used to inform wireless devices of updates to the system information in a cell. Paging can also be used for informing wireless devices of an ongoing public warning such as Earthquake & Tsunami Warning System (ETWS) or Commercial Mobile Telephone Alerts (CMAS).

A wireless device in Radio Resource Control Idle (RRC_IDLE) or RRC_INACTIVE state may camp on a cell and, while camping, may monitor the paging channel associated with that cell. The wireless device may be configured to monitor repeatedly occurring paging occasions (POs) and may reside in a Discontinuous Reception (DRX) sleep mode in between the paging occasions. When the wireless device is paged at such a paging occasion, the paging may be indicated on the Physical Downlink Control Channel (PDCCH) in the form of a Downlink (DL) scheduling allocation addressed to the Paging-Radio Network Temporary Identifier (P-RNTI) (which may be shared by all wireless devices), i.e., the Cyclic Redundancy Check (CRC) of the Downlink Control Information (DCI) transmitted on the PDCCH may be scrambled with the P-RNTI. This DL scheduling allocation may indicate the DL transmission resources on the Physical Downlink Shared Channel (PDSCH), where the actual paging message is transmitted. Note that the expression that a PDCCH transmission or DCI is addressed to the P-RNTI may mean that the CRC of the DCI on the PDCCH is scrambled with the P-RNTI.

A wireless device in RRC_IDLE or RRC_INACTIVE state, which receives a DL scheduling allocation on the PDCCH addressed to the P-RNTI at one of the wireless device's paging occasions, receives and reads the paging message from the allocated DL transmission resources on the PDSCH to find out whether the paging message is intended for the wireless device. The wireless device(s) that is(are) subject to the paging is(are) indicated in the paging message through one or more wireless device paging identifiers (e.g., 5G System Architecture Evolution (SAE)-Temporary Mobile Subscriber Identity (S-TMSI) or International Mobile Subscriber Identity (IMSI) for a wireless device in RRC_IDLE state (and in cases of state mismatch also RRC_INACTIVE state) and I-RNTI for a wireless device in RRC_INACTIVE state), where each wireless device paging identifier is included in a paging record. In a wireless communication standard such as Long Term Evolution (LTE), up to 16 wireless devices may be addressed in the same paging message, i.e., there may be up to 16 paging records in one paging message, but this may possibly be increased, e.g. to 32, in other wireless communication standards such as NR.

The DRX cycle (which may be or essentially be the time duration between two paging occasions for a wireless device) as well as parameters for calculation of the paging occasions may be configured via the system information. The wireless device can either select the DRX cycle as broadcasted in system information or negotiate an individual DRX cycle with the Core Network (CN). Paging occasions are distributed in the DRX cycle and wireless devices are distributed to the paging occasions based on the wireless device ID. Each wireless device may be allocated only one (i.e., monitors only one) paging occasion per DRX cycle. Depending, e.g., on deployment scenario and expected paging load, the network can configure paging occasions with different density in the time domain. The denser the paging occasions, the more paging occasions within a DRX cycle to distribute to wireless devices and the greater the resulting paging capacity. In a wireless communication standard such as LTE, the densest possible paging occasion configuration may be 4 paging occasions (POs) per radio frame, where each paging occasion has the length of a subframe, i.e., 1 ms, and a radio frame consists of 10 subframe adding up to a length of 10 ms. This PO density results from a configuration where every radio frame is a paging frame (e.g., a radio frame which contains one or more PO(s)) and 4 POs are configured per paging frame.

One function of system information in a cellular network is to inform a wireless device of the configurations to apply when accessing the network or performing various other actions, such as reselecting between cells in energy-saving states, like RRC_INACTIVE and RRC_IDLE states.

On higher carrier frequencies, common (broadcast) control signals, like paging and system information, may be transmitted using beam sweeping. For instance, in the frequency range referred to as FR2, i.e., 24250-52600 MHz, a beam sweep may contain up to 64 beams. For paging, paging transmissions may be performed in the form of an integrated PDCCH+PDSCH beam sweep or as two separate beam sweeps: a PDCCH beam sweep (with PDSCH resource allocations addressed to the P-RNTI) followed by a PDSCH beam sweep where the PDSCH transmissions contain the RRC Paging message. One possible motivation for using two separate beam sweeps is that a wireless device in an energy-saving RRC_IDLE or RRC_INACTIVE state may monitor the PDCCH for as short time as possible and a separate PDCCH beam sweep may have a shorter duration than an integrated PDCCH+PDSCH beam sweep, meaning that a separate PDCCH beam sweep may allow the wireless device to return to sleep mode earlier, at least in the cases where no wireless device is paged in the paging occasion. The paging that includes a separate PDCCH beam sweep may be transmitted followed by a separate PDSCH beam sweep, which is referred to as "dual beam sweep paging". Note that other broadcast transmissions than paging, e.g., broadcast of system information, may also be performed using dual beam sweep broadcast/transmission.

The time density of the PDCCH beams and the time duration of each PDCCH beam in a beam sweep are still being discussed, but one possible realistic assumption is that there will be two beams per slot (where a slot consists of 14 OFDM symbols), while a PDSCH beam sweep may possibly require scarcer beams due to longer duration of each individual beam. Note that it is assumed that a large number of beams cannot be transmitted back to back. Some gaps may have to be included in the beam sweep to provide opportunities, e.g., for uplink transmissions in a TDD system or for Ultra-Reliable Low Latency Communications (URLLC) related transmissions or other transmissions with low latency requirements.

SUMMARY

Some embodiments advantageously provide methods, systems, and apparatuses for scheduling Physical Downlink Shared Channel (PDSCH) beam sweep paging such as by using at least one bit in the Downlink Control Information (DCI).

When dual beam sweep paging is used, the DL resource allocation in a PDCCH transmission may be able to allocate DL transmission resources for a PDSCH transmission (i.e., the PDSCH beam corresponding the PDCCH beam) at least a time interval (or number of slots) ahead equal to the duration of the PDCCH beam sweep (e.g., 32 slots assuming 64 beams with 2 beams per slot), but even longer in some embodiments, in order to allow a small gap between the beam sweeps and also to accommodate that the PDSCH beam sweep may have a longer duration than a PDCCH beam sweep. To help handle some extent of PDSCH sliding in relation to the PDCCH, as described herein, even longer times (or number of slots) between the PDCCH transmission and the associated PDSCH transmission may be possible.

To help solve at least some of the problems with existing system or under discussion, the disclosure utilizes bits in the DL resource allocation DCI, which are reserved/unused when the DL resource allocating DCI is used for paging (or system information transmission) to specify DL resource allocation variants that are suitable for dual beam sweep paging (or more generally, dual-beam sweep of PDCCH and associated PDSCH, irrespective of payload) and/or to accommodate PDSCH sliding.

In some embodiments, reserved bits in the DCI for DL resource allocation may be utilized to provide explicit partial or complete time domain resource allocation, to replace or be combined with the time domain resource allocation in a time domain resource allocation table. These bits may also provide parameter(s) to be combined with (e.g., by adding an offset) a time domain resource allocation configuration in a time domain resource allocation table. There may be bits that are reserved/unused when the DCI is used for paging which are not reserved/unused when the DCI is used for resource allocation for system information transmission, such as the bits indicating the redundancy version.

In some embodiments, one or more separate time domain resource allocation table(s) (of regular or extended size), containing time domain resource allocation configurations suitable for dual beam sweep paging and PDSCH sliding may be implemented, where unusually long scheduling gap (time—or number of slots—from the PDCCH transmission to the associated PDSCH transmission surpassing a predefined scheduling gap threshold) may be needed in the allocation.

In other embodiments, the time domain resource allocation table used in conjunction with dual beam sweep paging (or other dual beam sweep broadcast transmission) is adapted/tailored for dual beam sweep paging (or other dual beam sweep broadcast transmission) in terms of inclusion of time domain resource allocation configurations with unusually long scheduling gap. The adapted/tailored time domain resource allocation table may be of a predefined size or may be extended with time domain resource allocation configurations adapted/tailored for allocations ahead in time in conjunction with dual beam sweep paging (or other dual beam sweep broadcast transmission) such that, in one or more examples, the PDSCH beam sweep can be scheduled ahead in time such as of the PDCCH beam sweep.

According to one aspect of the disclosure, a network node for performing dual beam sweep is provided. The dual beam sweep includes a physical downlink control channel (PDCCH) beam sweep and a corresponding physical downlink shared channel (PDSCH) beam sweep that are separated in time to each other. The network node includes processing circuitry configured to indicate, in a PDCCH transmission within the PDCCH beam sweep, a time domain resource allocation for the corresponding PDSCH beam where the time domain resource allocation corresponds to an offset in time slots between the PDCCH beam and the corresponding PDSCH beam and where the offset is one of a plurality of offsets that can be indicated for the corresponding PDSCH beam. The processing circuitry is further configured to perform the dual beam sweep using at least in part the indication.

According to one or more embodiments of this aspect, the time domain resource allocation comprises a plurality of time domain resource configurations and wherein each of the plurality of time domain resource allocations comprises an offset. According to one or more embodiments of this aspect, the network node is further configured to determine to use an extended time resource allocation, wherein the indication indicates a time resource allocation from an extended time domain resource allocation which comprises the plurality of offsets being greater than a standard number of offsets.

According to one or more embodiments of this aspect, the standard number of offsets and/or time domain resource configurations is 16.

According to one or more embodiments of this aspect, the determining is based on a paging load.

According to one or more embodiments of this aspect, the indication is provided at least in part by downlink control information, DCI, in the PDCCH transmission within the PDCCH beam sweep. According to one or more embodiments of this aspect, the indication is provided at least in part by at least one bit in downlink control information, DCI, reserved for redundancy functionality. According to one or more embodiments of this aspect, the offset is equal to or greater than a duration of the PDCCH beam sweep. According to one or more embodiments of this aspect, the offset corresponds to at least 32 time slots.

According to one or more embodiments of this aspect, the indication corresponds to an index pointing into a resource allocation table and at least one bit for one of replacing and modifying a parameter in the resource allocation table. According to one or more embodiments of this aspect, the indication corresponds to: a plurality of bits in downlink control information, DCI, configured to indicate an index pointing into a resource allocation table, and at least one other bit in the DCI configured to extend a bit length of the index. According to one or more embodiments of this aspect, the dual beam sweep corresponds to a dual beam sweep broadcast transmission, and the indication of the time domain resource allocation is provided at least in part by at least one bit, in the PDCCH, associated with unicast transmission.

According to another aspect of the disclosure, a wireless device for communicating with a network node configured to perform dual beam sweeps including a physical downlink control channel, PDCCH, beam sweep and a corresponding physical downlink shared channel, PDSCH, beam sweep that are non-adjacent in time to each other is provided. The wireless device includes processing circuitry configured to receive, in a PDCCH transmission within the PDCCH beam sweep, an indication of a time domain resource allocation for the corresponding PDSCH beam where the time domain resource allocation corresponds to an offset in time slots between the PDCCH beam and the corresponding PDSCH beam and where the offset is one of a plurality of offsets that can be indicated for the corresponding PDSCH beam. The processing circuitry is further configured to receive the PDSCH beam of the dual beam sweep based at least in part on the time domain resource allocation.

According to one or more embodiments of this aspect, the time domain resource allocation comprises a plurality of time domain resource configurations and wherein each of the plurality of time domain resource allocations comprises an offset.

According to one or more embodiments of this aspect, the indication indicates a time resource allocation from an extended time domain resource allocation which comprises the plurality of offsets being greater than a standard number of offsets.

According to one or more embodiments of this aspect, the standard number of offsets and/or time domain resource configurations is 16.

According to one or more embodiments of this aspect, the indication is provided at least in part by downlink control information, DCI, in the PDCCH transmission within the PDCCH beam sweep. According to one or more embodiments of this aspect, the indication is provided at least in part by at least one bit in downlink control information, DCI, reserved for redundancy functionality. According to one or more embodiments of this aspect, the offset is equal to or greater than a duration of the PDCCH beam sweep.

According to one or more embodiments of this aspect, the offset corresponds to at least 32 time slots. According to one or more embodiments of this aspect, the indication corresponds to an index pointing into a resource allocation table and at least one bit for one of replacing and modifying a parameter in the resource allocation table. According to one or more embodiments of this aspect, the indication corresponds to a plurality of bits in downlink control information, DCI, configured to indicate an index pointing into a resource allocation table and, at least one other bit in the DCI configured to extend a bit length of the index. According to one or more embodiments of this aspect, the plurality of offsets is greater than 16 offsets. According to one or more embodiments of this aspect, the dual beam sweep corresponds to a dual beam sweep broadcast transmission where the indication of the time domain resource allocation being provided at least in part by at least one bit, in the PDCCH, associated with unicast transmission.

According to another aspect of the disclosure, a method implemented in a network node for performing dual beam sweep where the dual beam sweep includes a physical downlink control channel (PDCCH) beam sweep and a corresponding physical downlink shared channel (PDSCH) beam sweep that are separated in time to each other. A time domain resource allocation for the corresponding PDSCH beam is indicated in a PDCCH transmission within the PDCCH beam sweep where the time domain resource allocation corresponds to an offset in time slots between the PDCCH beam and the corresponding PDSCH beam. The offset is one of a plurality of offsets that can be indicated for the corresponding PDSCH beam. The dual beam sweep is performed using at least in part the indication.

According to one or more embodiments of this aspect, the time domain resource allocation comprises a plurality of time domain resource configurations and wherein each of the plurality of time domain resource allocations comprises an offset.

According to one or more embodiments of this aspect, the network node determines to use an extended time resource allocation, wherein the indication indicates a time resource allocation from an extended time domain resource allocation which comprises the plurality of offsets being greater than a standard number of offsets.

According to one or more embodiments of this aspect, the standard number of offsets and/or time domain resource configurations is 16.

According to one or more embodiments of this aspect, the determining is based on a paging load.

According to one or more embodiments of this aspect, the indication is provided at least in part by downlink control information, DCI, in the PDCCH transmission within the PDCCH beam sweep. According to one or more embodiments of this aspect, the indication is provided at least in part by at least one bit in downlink control information, DCI, reserved for redundancy functionality. According to one or more embodiments of this aspect, the offset is equal to or greater than a duration of the PDCCH beam sweep. According to one or more embodiments of this aspect, the offset corresponds to at least 32 time slots.

According to one or more embodiments of this aspect, the indication corresponds to an index pointing into a resource allocation table and at least one bit for one of replacing and modifying a parameter in the resource allocation table. According to one or more embodiments of this aspect, the indication corresponds to a plurality of bits in downlink control information, DCI, configured to indicate an index pointing into a resource allocation table, and at least one other bit in the DCI configured to extend a bit length of the index. According to one or more embodiments of this aspect, the dual beam sweep corresponds to a dual beam sweep broadcast transmission where the indication of the time domain resource allocation being provided at least in part by at least one bit, in the PDCCH, associated with unicast transmission.

According to another aspect of the disclosure, a method implemented in a wireless device for communicating with a network node configured to perform dual beam sweeps including a physical downlink control channel (PDCCH) beam sweep and a corresponding physical downlink shared channel (PDSCH) beam sweep that are non-adjacent in time to each other is provided. A time domain resource allocation for the corresponding PDSCH beam is received in a PDCCH transmission within the PDCCH beam sweep. The time domain resource allocation corresponds to an offset in time slots between the PDCCH beam and the corresponding PDSCH beam where the offset is one of a plurality of offsets that can be indicated for the corresponding PDSCH beam. The PDSCH beam of the dual beam sweep is received based at least in part on the time domain resource allocation.

According to one or more embodiments of this aspect, the time domain resource allocation comprises a plurality of time domain resource configurations and wherein each of the plurality of time domain resource allocations comprises an offset.

According to one or more embodiments of this aspect, the indication indicates a time resource allocation from an extended time domain resource allocation which comprises the plurality of offsets being greater than a standard number of offsets.

According to one or more embodiments of this aspect, the standard number of offsets and/or time domain resource configurations is 16.

According to one or more embodiments of this aspect, the indication is provided at least in part by downlink control information, DCI, in the PDCCH transmission within the PDCCH beam sweep. According to one or more embodiments of this aspect, the indication is provided at least in part by at least one bit in downlink control information, DCI, reserved for redundancy functionality. According to one or more embodiments of this aspect, the offset is equal to or greater than a duration of the PDCCH beam sweep. According to one or more embodiments of this aspect, the offset is at least 32 time slots. According to one or more embodiments of this aspect, the indication corresponds to an index pointing into a resource allocation table and at least one bit for one of replacing and modifying a parameter in the resource allocation table.

According to one or more embodiments of this aspect, the indication corresponds to a plurality of bits in downlink control information, DCI, configured to indicate an index pointing into a resource allocation table, and at least one other bit in the DCI configured to extend a bit length of the index. According to one or more embodiments of this aspect, the plurality of offsets is greater than 16 offsets.

According to one or more embodiments of this aspect, the dual beam sweep corresponds to a dual beam sweep broadcast transmission where the indication of the time domain resource allocation is provided at least in part by at least one bit, in the PDCCH, associated with unicast transmission.

According to another aspect of the disclosure, a computer program is provided comprising instructions which when executed on a computer causes the computer to perform any one of the methods described above.

According to another aspect of the disclosure, a computer program product or storage medium comprising a computer program is provided wherein the computer program comprises instructions which when executed on a computer causes the computer to perform any one of the methods described above.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 5 is a flowchart illustrating exemplary methods implemented in a communication system including a host computer, a network node and a wireless device for receiving user data from the wireless device at a host computer according to some embodiments of the present disclosure;

FIG. 6 is a flowchart illustrating exemplary methods implemented in a communication system including a host computer, a network node and a wireless device for receiving user data at a host computer according to some embodiments of the present disclosure;

DETAILED DESCRIPTION

Figure 1:
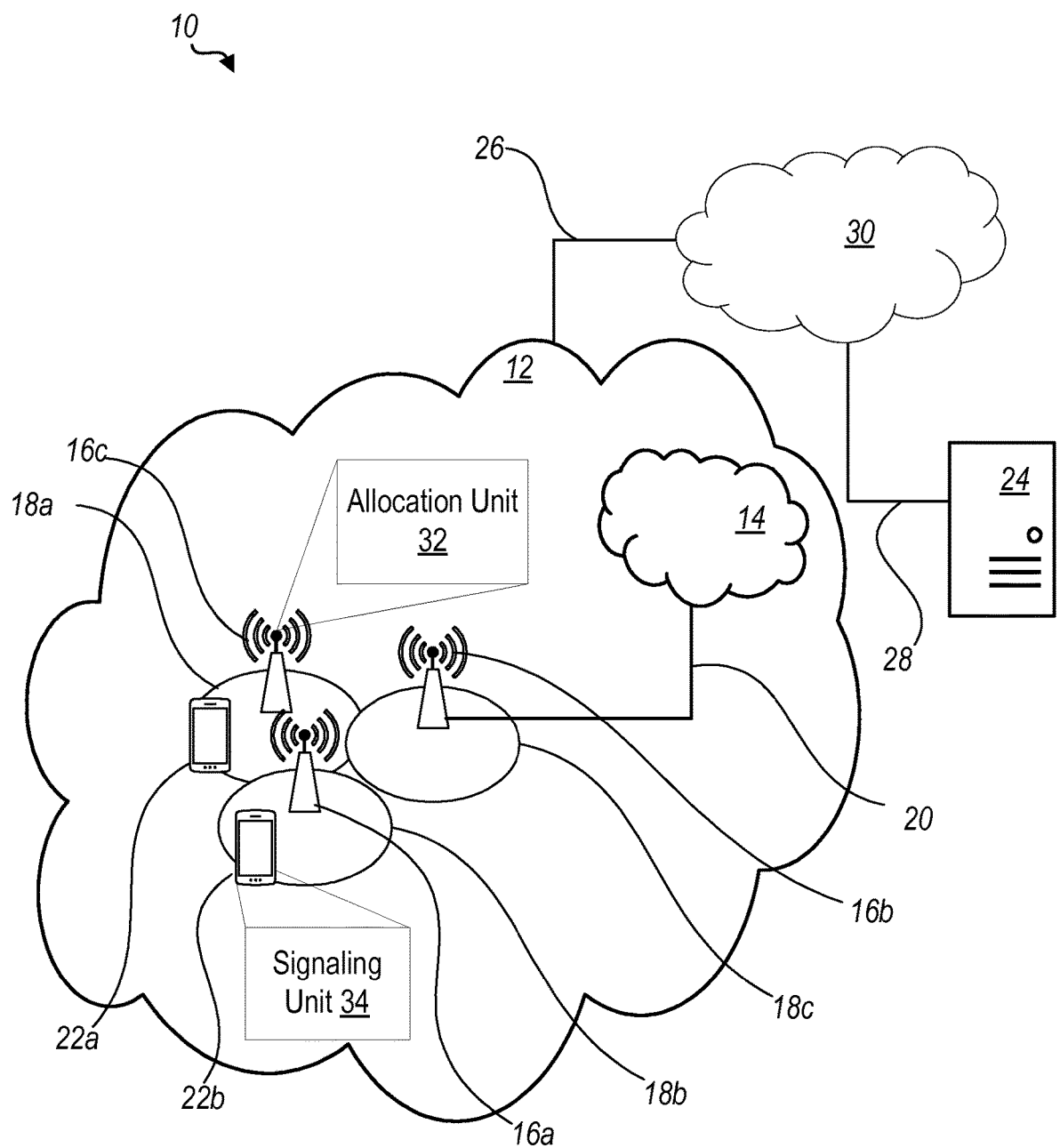
FIG. 1 is a schematic diagram of an exemplary network architecture illustrating a communication system connected via an intermediate network to a host computer according to the principles in the present disclosure.

Paging occasions and the use of beam sweeping in existing systems and/or under discussion may impose additional constraints on PDCCH and PDSCH transmission that may not be present for regular data transmission. For example, performing a single paging sweep for adjacent PDCCH+PDSCH transmission in each beam may lead to excessively long paging occasions in some deployments and using two successive beam sweeps (one for the PDCCH and one for the PDSCH) may also introduce properties in the transmission that deviate from the properties of regular data transmission.

However, the resource allocation schemes under considered for wireless communication standards such as NR in 3GPP have not taken the properties of paging (and system information) into account such as properties of the wireless transmission in terms of resource allocation when the dual beam sweep method for paging is used (i.e. a PDCCH beam sweep followed by a PDSCH beam sweep).

The disclosure advantageously solves at least some of the problem(s) with existing systems or discussions by, for example, DL resource allocation. The disclosure allows the network such a network node or the core network, etc. to schedule and perform paging in the form of two separate beam sweeps (a PDCCH beam sweep followed by a PDSCH beam sweep, which is one of the methods under consideration in 3GPP), where the PDSCH beam sweep can be scheduled ahead in time, e.g., when the PDCCH beam sweep contains or includes 64 beams, of for example, the PDCCH beam sweep. Furthermore, the disclosure allows the network, network node and/or core network to accommodate temporary paging load peaks even in deployments scenarios with dense paging occasions where "PDSCH sliding" occurs during high paging load. The extended time resource allocation may be activated only when needed, while the other approach described herein may continue to be used in cases where it may be most efficient.

Before describing in detail exemplary embodiments, it is noted that the embodiments reside primarily in combinations of apparatus components and processing steps related to scheduling Physical Downlink Shared Channel (PDSCH) beam sweep paging using, for example, at least one bit in the Downlink Control Information. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device such as a UE or a radio network node.

In some embodiments, the non-limiting terms wireless device a user equipment (UE) are used interchangeably. The wireless device herein can be any type of wireless device capable of communicating with a network node or another wireless device over radio signals, such as wireless device. The wireless device may also be a radio communication device, target device, device to device (D2D) wireless device, machine type wireless device or wireless device capable of machine to machine communication (M2M), low-cost and/or low-complexity wireless device, a sensor equipped with wireless device, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, IAB node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

The term time resource used herein may correspond to any type of physical resource or radio resource expressed in terms of length of time. Examples of time resources are: symbol, time slot, subframe, radio frame, TTI, interleaving time, etc.

The term TTI used herein may correspond to any time period (TO) over which a physical channel can be encoded and interleaved for transmission. The physical channel is decoded by the receiver over the same time period (TO) over which it was encoded. The TTI may also interchangeably called as short TTI (sTTI), transmission time, slot, sub-slot, mini-slot, short subframe (SSF), mini-subframe etc.

It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station or eNodeB. An uplink direction may refer to a data transfer direction from a terminal to a network node, e.g., base station and/or relay station. A downlink direction may refer to a data transfer direction from a network node, e.g., base station and/or relay node, to a terminal. UL and DL may be associated to different frequency resources, e.g., carriers and/or spectral bands. A cell may comprise at least one uplink carrier and at least one downlink carrier, which may have different frequency bands. A network node, e.g., a base station or eNodeB, may be adapted to provide and/or define and/or control one or more cells, e.g., a PCell and/or a LA cell.

Configuring a terminal or wireless device or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

One or more embodiments provide scheduling Physical Downlink Shared Channel (PDSCH) beam sweep paging using at least one bit in the Downlink Control Information (DCI).

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device 22a located in coverage area 18a is configured to wirelessly connect to, or be paged by, the corresponding network node 16c. A second wireless device 22b in coverage area 18b is wirelessly connectable to the corresponding network node 16a. While a plurality of wireless devices 22a, 22b (collectively referred to as wireless devices 22) are illustrated in this example, the disclosed embodiments are equally applicable to a situation where a sole wireless device is in the coverage area or where a sole wireless device is connecting to the corresponding network node 16. Note that although only two wireless devices 22 and three network nodes 16 are shown for convenience, the communication system may include many more wireless devices 22 and network nodes 16.

Also, it is contemplated that a wireless device 22 can be in simultaneous communication and/or configured to separately communicate with more than one network node 16 and more than one type of network node 16. For example, a wireless device 22 can have dual connectivity with a network node 16 that supports LTE and the same or a different network node 16 that supports NR. As an example, wireless device 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected wireless devices 22a, 22b and the host computer 24. The connectivity may be described as an over-the-top (OTT) connection. The host computer 24 and the connected wireless devices 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected wireless device 22a. Similarly, the network node 16 need not be aware of the future routing of an outgoing uplink communication originating from the wireless device 22a towards the host computer 24.

A network node 16 is configured to include an allocation unit 32 which is configured to signal a scheduling of the PDSCH beam sweep associated with the PDCCH beam sweep before performing PDCCH beam sweep, as described herein. A wireless device 22 is configured to include a signaling unit 34 which is configured to receiving signaling of a scheduling of the PDSCH beam sweep associated with a PDCCH beam sweep before receiving the PDCCH beam sweep as described herein.

Example implementations, in accordance with an embodiment, of the wireless device 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a wireless device 22 connecting via an OTT connection 52 terminating at the wireless device 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to provide information associated with the scheduling of the PDSCH beam sweep associated with the PDCCH beam sweep before the PDCCH beam sweep is performed, as described herein. In one or more embodiments, the determination of the scheduled is performed by the host computer 24, and/or one or more network node 16 functions may be performed by the host computer 24.

The communication system 10 further includes a network node 16 provided in a communication system 10 and comprising hardware 58 enabling it to communicate with the host computer 24 and with the wireless device 22. The hardware 58 may include a communication interface 60 for setting up and maintaining a wired or wireless connection with an interface of a different communication device of the communication system 10, as well as a radio interface 62 for setting up and maintaining at least a wireless connection 64 with a wireless device 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include allocation unit 32 configured to signal a scheduling of the PDSCH beam sweep associated with the PDCCH beam sweep before performing PDCCH beam sweep, as described herein.

The communication system 10 further includes the wireless device 22 already referred to. The wireless device 22 may have hardware 80 that may include a radio interface 82 configured to set up and maintain a wireless connection 64 with a network node 16 serving a coverage area 18 in which the wireless device 22 is currently located. The radio interface 82 may be formed as or may include, for example, one or more RF transmitters, one or more RF receivers, and/or one or more RF transceivers.

The hardware 80 of the wireless device 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the wireless device 22 may further comprise software 90, which is stored in, for example, memory 88 at the wireless device 22, or stored in external memory (e.g., database, storage array, network storage device, etc.) accessible by the wireless device 22. The software 90 may be executable by the processing circuitry 84. The software 90 may include a client application 92. The client application 92 may be operable to provide a service to a human or non-human user via the wireless device 22, with the support of the host computer 24. In the host computer 24, an executing host application 50 may communicate with the executing client application 92 via the OTT connection 52 terminating at the wireless device 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by wireless device 22. The processor 86 corresponds to one or more processors 86 for performing wireless device 22 functions described herein. The wireless device 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to wireless device 22. For example, the processing circuitry 84 of the wireless device 22 may include a signaling unit 34 configured to receiving signaling of a scheduling of the PDSCH beam sweep associated with a PDCCH beam sweep before receiving the PDCCH beam sweep as described herein.

Figure 2:
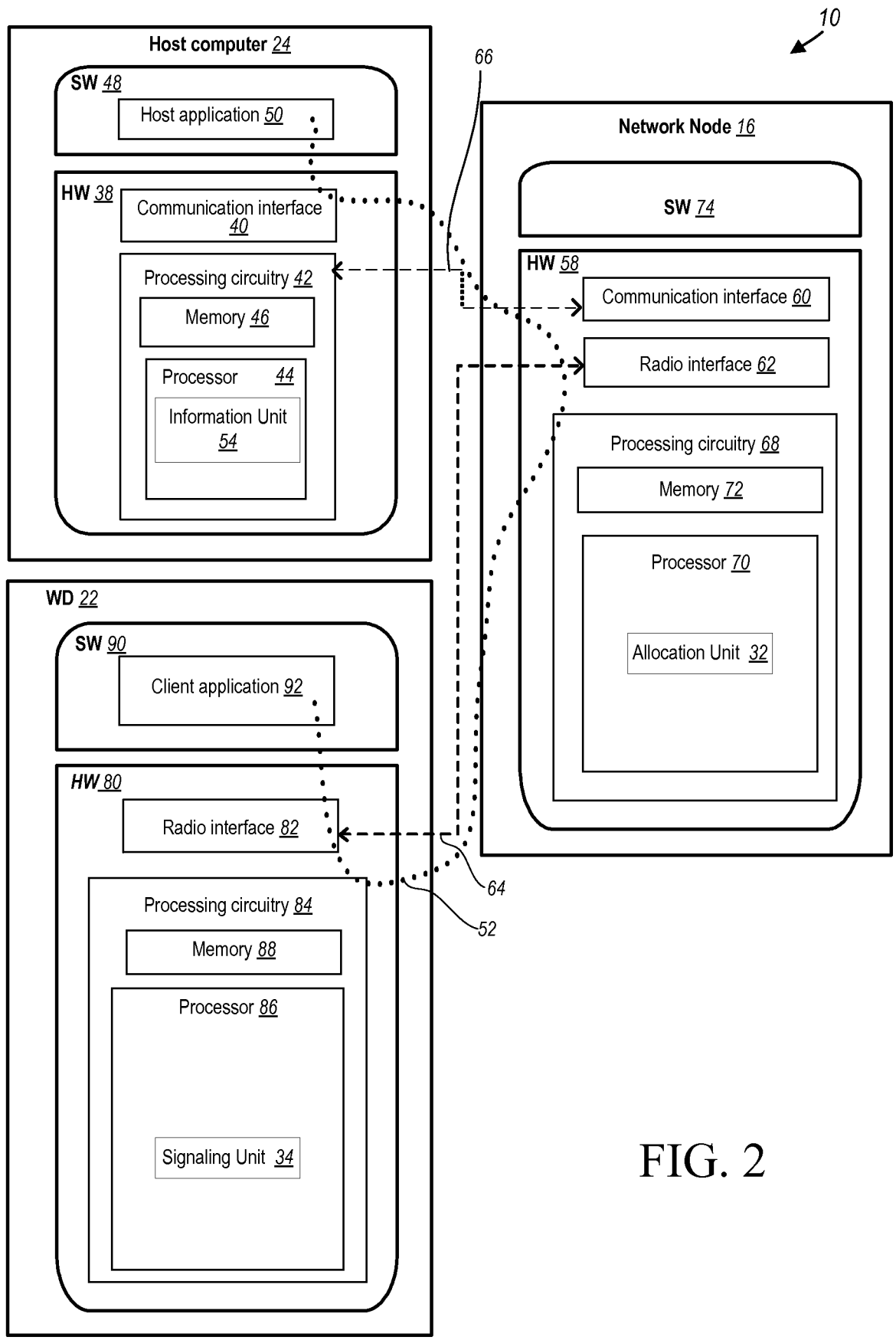
FIG. 2 is a block diagram of a host computer communicating via a network node with a wireless device over an at least partially wireless connection according to some embodiments of the present disclosure.

In some embodiments, the inner workings of the network node 16, wireless device 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the wireless device 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the wireless device 22 and the network node 16 is in accordance with the teachings of the embodiments described throughout this disclosure. One or more of the various embodiments improve the performance of OTT services provided to the wireless device 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and wireless device 22, in response to variations in the measurement results. The measurement procedure and/or the network functionality for reconfiguring the OTT connection 52 may be implemented in the software 48 of the host computer 24 or in the software 90 of the wireless device 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary wireless device signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the wireless device 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the wireless device 22, and/or preparing/terminating/maintaining/supporting/ending in receipt of a transmission from the wireless device 22.

In some embodiments, the host computer 24 includes processing circuitry 42 and a communication interface 40 that is configured to a communication interface 40 configured to receive user data originating from a transmission from a wireless device 22 to a network node 16. In some embodiments, the wireless device 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as allocation unit 32, signaling unit 34 and information unit 54 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 3, 4:
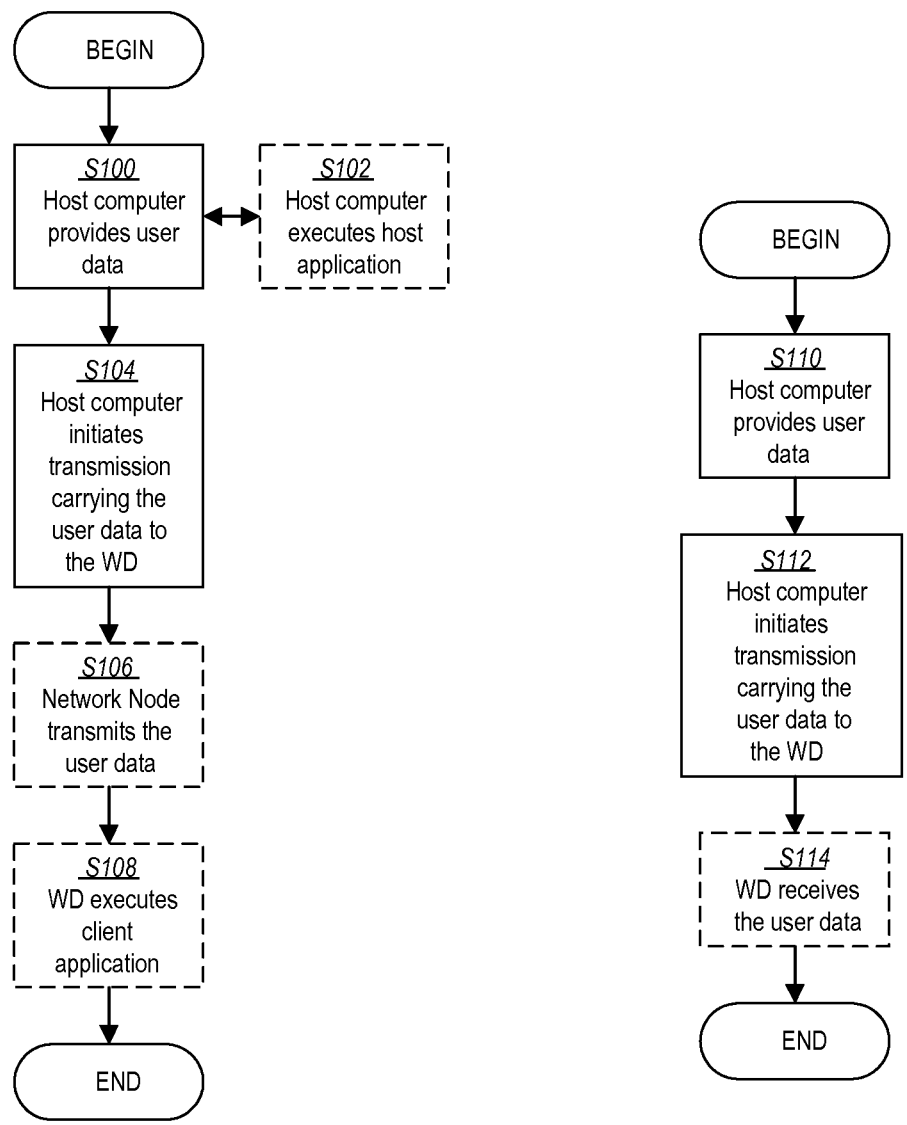
FIG. 3 is a flowchart illustrating exemplary methods implemented in a communication system including a host computer, a network node and a wireless device for executing a client application at a wireless device according to some embodiments of the present disclosure.
FIG. 4 is a flowchart illustrating exemplary methods implemented in a communication system including a host computer, a network node and a wireless device for receiving user data at a wireless device according to some embodiments of the present disclosure.

FIG. 3 is a flowchart illustrating an exemplary method implemented in a communication system, such as, for example, the communication system of FIGS. 1 and 2, in accordance with one embodiment. The communication system may include a host computer 24, a network node 16 and a wireless device 22, which may be those described with reference to FIG. 2. In a first step of the method, the host computer 24 provides user data (block S100). In an optional substep of the first step, the host computer 24 provides the user data by executing a host application, such as, for example, the host application 50 (block S102). In a second step, the host computer 24 initiates a transmission carrying the user data to the wireless device 22 (block S104). In an optional third step, the network node 16 transmits to the wireless device 22 the user data which was carried in the transmission that the host computer 24 initiated, in accordance with the teachings of the embodiments described throughout this disclosure (block S106). In an optional fourth step, the wireless device 22 executes a client application, such as, for example, the client application 92, associated with the host application 50 executed by the host computer 24 (block S108).

FIG. 4 is a flowchart illustrating an exemplary method implemented in a communication system, such as, for example, the communication system of FIG. 1, in accordance with one embodiment. The communication system may include a host computer 24, a network node 16 and a wireless device 22, which may be those described with reference to FIGS. 1 and 2. In a first step of the method, the host computer 24 provides user data (block S110). In an optional substep (not shown) the host computer 24 provides the user data by executing a host application, such as, for example, the host application 50. In a second step, the host computer 24 initiates a transmission carrying the user data to the wireless device 22 (block S112). The transmission may pass via the network node 16, in accordance with the teachings of the embodiments described throughout this disclosure. In an optional third step, the wireless device 22 receives the user data carried in the transmission (block S114).

FIG. 5 is a flowchart illustrating an exemplary method implemented in a communication system, such as, for example, the communication system of FIG. 1, in accordance with one embodiment. The communication system may include a host computer 24, a network node 16 and a wireless device 22, which may be those described with reference to FIGS. 1 and 2. In an optional first step of the method, the wireless device 22 receives input data provided by the host computer 24 (block S116). In an optional substep of the first step, the wireless device 22 executes the client application 92, which provides the user data in reaction to the received input data provided by the host computer 24 (block S118). Additionally or alternatively, in an optional second step, the wireless device 22 provides user data (block S120). In an optional substep of the second step, the wireless device provides the user data by executing a client application, such as, for example, client application 92 (block S122). In providing the user data, the executed client application 92 may further consider user input received from the user. Regardless of the specific manner in which the user data was provided, the wireless device 22 may initiate, in an optional third substep, transmission of the user data to the host computer 24 (block S124). In a fourth step of the method, the host computer 24 receives the user data transmitted from the wireless device 22, in accordance with the teachings of the embodiments described throughout this disclosure (block S126).

FIG. 6 is a flowchart illustrating an exemplary method implemented in a communication system, such as, for example, the communication system of FIG. 1, in accordance with one embodiment. The communication system may include a host computer 24, a network node 16 and a wireless device 22, which may be those described with reference to FIGS. 1 and 2. In an optional first step of the method, in accordance with the teachings of the embodiments described throughout this disclosure, the network node 16 receives user data from the wireless device 22 (block S128). In an optional second step, the network node 16 initiates transmission of the received user data to the host computer 24 (block S130). In a third step, the host computer 24 receives the user data carried in the transmission initiated by the network node 16 (block S132).

Figure 7:
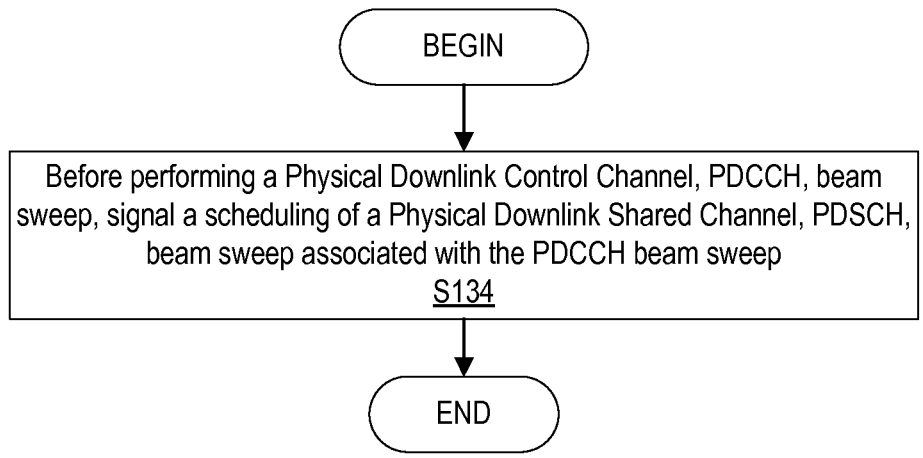
FIG. 7 is a flowchart of an exemplary process in a network node for scheduling Physical Downlink Shared Channel (PDSCH) beam sweep paging using at least one bit in the Downlink Control Information according to some embodiments of the present disclosure.

FIG. 7 is a flowchart of an exemplary process in a network node 16 for scheduling Physical Downlink Shared Channel (PDSCH) beam sweep paging using at least one bit in the Downlink Control Information according to some embodiments of the present disclosure. The network node 16 such as via processing circuitry 68 and/or allocation unit 32 is configured to, before performing a Physical Downlink Control Channel, PDCCH, beam sweep, signal (block S134) a scheduling of a Physical Downlink Shared Channel, PDSCH, beam sweep associated with the PDCCH beam sweep. The scheduling information that is signaled is described herein.

In one or more embodiments, the signaling of the PDSCH beam sweep includes using at least one Downlink Control Information, DCI, bit for indicating a time domain resource allocation. In one or more embodiments, the signaling of the PDSCH beam sweep occurs a time duration before the PDCCH beam sweep, where the time duration is equal to or greater than the duration of the PDCCH beam sweep.

Figure 8:
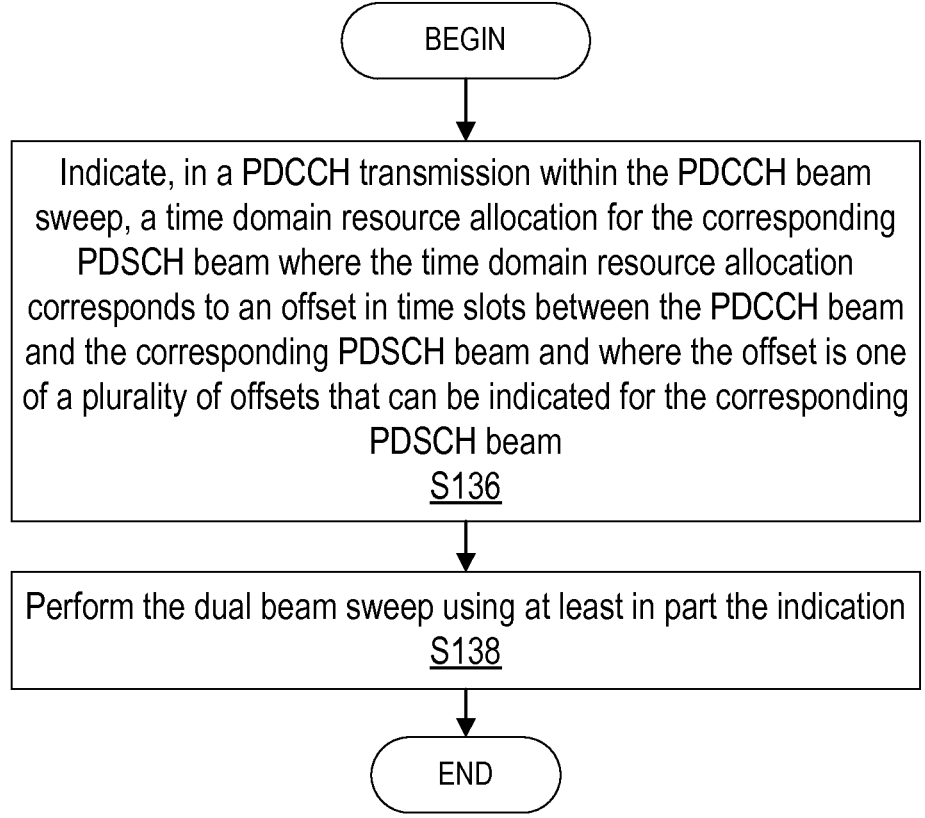
FIG. 8 is a flowchart of another exemplary process in a network node according to some embodiments of the present disclosure.

FIG. 8 is a flowchart of another exemplary process in a network node 16 according to some embodiments of the present disclosure. The network node 16 such as via processing circuitry 68 and/or allocation unit 32 is configured to indicate (block S136), in a PDCCH transmission within the PDCCH beam sweep, a time domain resource allocation for the corresponding PDSCH beam where the time domain resource allocation corresponds to an offset in time slots between the PDCCH beam and the corresponding PDSCH beam and where the offset is one of a plurality of offsets that can be indicated for the corresponding PDSCH beam, as described herein. The network node 16 such as via processing circuitry 68 and/or allocation unit 32 is configured to perform (block S138) the dual beam sweep using at least in part the indication, as described herein.

According to one or more embodiments, the indication is provided at least in part by downlink control information, DCI, in the PDCCH transmission within the PDCCH beam sweep. According to one or more embodiments, the indication is provided at least in part by at least one bit in downlink control information, DCI, reserved for redundancy functionality. According to one or more embodiments, the offset is equal to or greater than a duration of the PDCCH beam sweep.

According to one or more embodiments, the offset corresponds to at least 32 time slots. According to one or more embodiments, the indication corresponds to an index pointing into a resource allocation table and at least one bit for one of replacing and modifying a parameter in the resource allocation table. According to one or more embodiments, the indication corresponds to: a plurality of bits in downlink control information, DCI, configured to indicate an index pointing into a resource allocation table, and at least one other bit in the DCI configured to extend a bit length of the index. According to one or more embodiments, the dual beam sweep corresponds to a dual beam sweep broadcast transmission, and the indication of the time domain resource allocation being provided at least in part by at least one bit, in the PDCCH, associated with unicast transmission.

Figure 9:
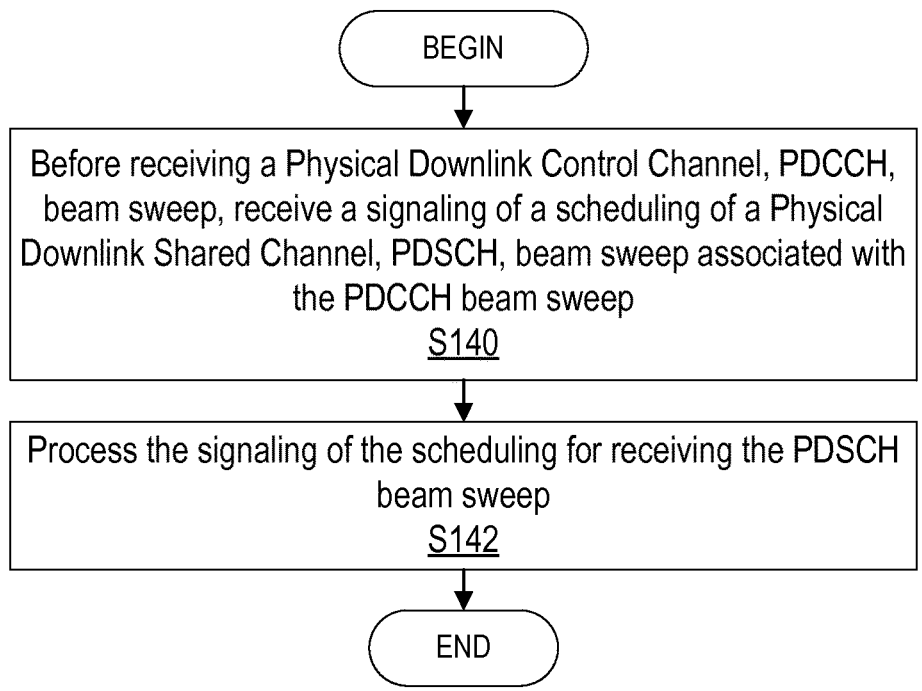
FIG. 9 is a flowchart of an exemplary process in a wireless device for receiving scheduling of Physical Downlink Shared Channel (PDSCH) beam sweep paging using at least one bit in the Downlink Control Information according to some embodiments of the present disclosure.

FIG. 9 is a flowchart of an exemplary process in a wireless device 22 for receiving scheduling of Physical Downlink Shared Channel (PDSCH) beam sweep paging using at least one bit in the Downlink Control Information according to some embodiments of the present disclosure. Wireless device 22 such as via processing circuitry 84 and/or signaling unit 34 is configured to before receiving a Physical Downlink Control Channel, PDCCH, beam sweep, receive (block S140) a signaling of a scheduling of a Physical Downlink Shared Channel, PDSCH, beam sweep associated with the PDCCH beam sweep. The information received in the signaling is described herein. Wireless device 22 such as via processing circuitry 84 and/or signaling unit 34 is configured to process (block S142) the signaling of the scheduling for receiving the PDSCH beam sweep, as described herein.

In one or more embodiments, the signaling of the scheduling of the PDSCH beam sweep includes using at least one Downlink Control Information, DCI, bit for indicating a time domain resource allocation. In one or more embodiments, the signaling of the scheduling of the PDSCH beam sweep occurs a time duration before the PDCCH beam sweep, where the time duration is equal to or greater than the duration of the PDCCH beam sweep.

Figure 10:
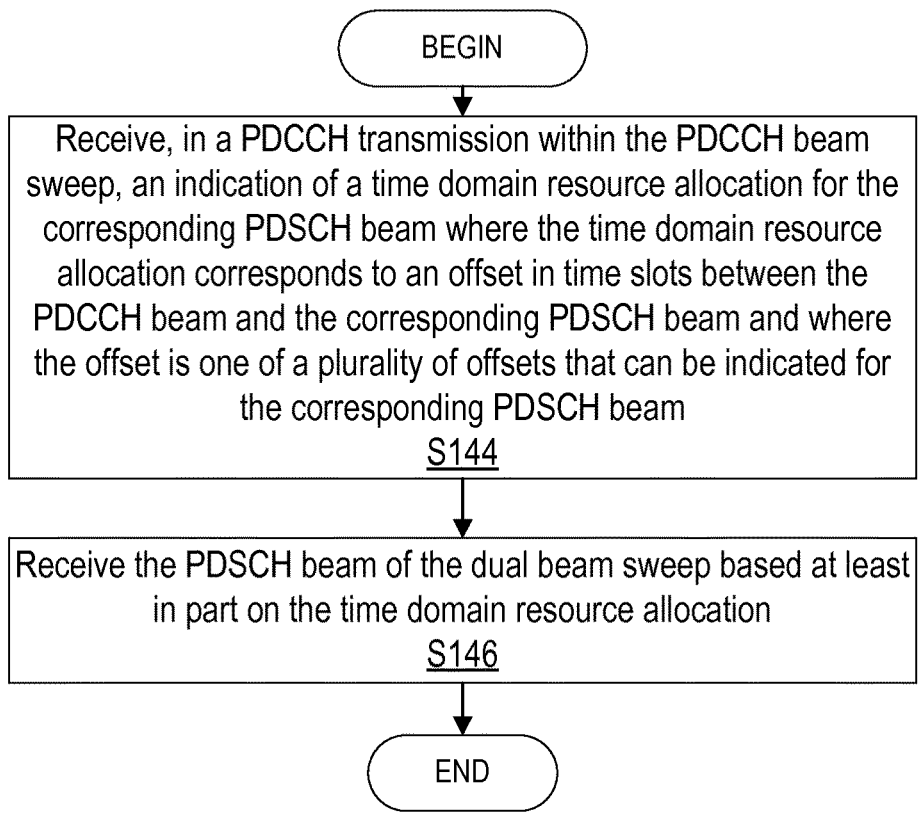
FIG. 10 is a flowchart of another exemplary process in a wireless device according to some embodiments of the present disclosure.

FIG. 10 is a flowchart of another exemplary process in a wireless device 22 according to some embodiments of the present disclosure. Wireless device 22 such as via processing circuitry 84 and/or signaling unit 34 is configured to receive (block S144), in a PDCCH transmission within the PDCCH beam sweep, an indication of a time domain resource allocation for the corresponding PDSCH beam where the time domain resource allocation corresponds to an offset in time slots between the PDCCH beam and the corresponding PDSCH beam, and where the offset is one of a plurality of offsets that can be indicated for the corresponding PDSCH beam, as described herein. Wireless device 22 such as via processing circuitry 84 and/or signaling unit 34 is configured to receive (block S146) the PDSCH beam of the dual beam sweep based at least in part on the time domain resource allocation, as described herein.

According to one or more embodiments, the indication is provided at least in part by downlink control information, DCI, in the PDCCH transmission within the PDCCH beam sweep. According to one or more embodiments, the indication is provided at least in part by at least one bit in downlink control information, DCI, reserved for redundancy functionality. According to one or more embodiments, the offset is equal to or greater than a duration of the PDCCH beam sweep.

According to one or more embodiments, the offset corresponds to at least 32 time slots. According to one or more embodiments, the indication corresponds to an index pointing into a resource allocation table and at least one bit for one of replacing and modifying a parameter in the resource allocation table. According to one or more embodiments, the indication corresponds to a plurality of bits in downlink control information, DCI, configured to indicate an index pointing into a resource allocation table and, at least one other bit in the DCI configured to extend a bit length of the index. According to one or more embodiments, the plurality of offsets is greater than 16 offsets. According to one or more embodiments, the dual beam sweep corresponds to a dual beam sweep broadcast transmission where the indication of the time domain resource allocation being provided at least in part by at least one bit, in the PDCCH, associated with unicast transmission.

Having generally described arrangements for signaling control information for configuring at least one signal waveform characteristic, details for these arrangements, functions and processes are provided as follows, and which may be implemented by the network node 16, wireless device 22 and/or host computer 24.

When paging including two separate beam sweeps are performed (i.e., a PDCCH beam sweep with PDSCH DL resource allocations followed by a PDSCH beam sweep with RRC Paging messages), the PDSCH transmission using the DL resource allocation of a certain PDCCH transmission may take place a relatively long time after the PDCCH transmission in existing system and/or standards under consideration. Hence, the PDCCH resource allocation may allocate resources unusually far ahead in time. This has not been anticipated by the resource allocation schemes that are being considered for wireless communication standards such as NR in 3GPP so far.

Another issue, which sheds light on the issue above, is that during high paging loads in a deployment with dense paging occasions, the execution of the PDCCH beam sweep and the PDSCH beam sweep for one paging occasion may take longer than the inter-paging occasion interval, resulting in that the PDSCH beam sweep of the subsequent paging occasion may be pushed further in time away from its associated PDCCH beam sweep. As a result, resource allocation on the PDCCH has to be able to allocate resources even further ahead in time to accommodate such cases of PDSCH transmissions being pushed in time (which herein also is referred to as "PDSCH sliding").

When dual beam sweep paging is implemented, the DL resource allocation in a PDCCH transmission may be able to allocate DL transmission resources for a PDSCH transmission (i.e., the PDSCH beam corresponding to the PDCCH beam) at least a time (or number of slots) ahead equal to the duration of the PDCCH beam sweep (e.g., 32 slots assuming 64 beams with 2 beams per slot), but longer in some cases, in order to allow a small gap between the PDCCH and the PDSCH beam sweeps and also to accommodate that the PDSCH beam sweep may have a longer duration than a PDCCH beam sweep. In one or more embodiments, this information of the allocation may be signaled to the wireless device 22. To be able to handle some extent of PDSCH sliding, even longer times (or number of slots) between the PDCCH transmission and the associated PDSCH transmission are possible.

DL resource allocations may be transmitted, i.e., signaled such as by network node 16, through DCI on the PDCCH. A DL resource allocation may consist of a frequency domain resource allocation and a time domain resource allocation, where the time domain resource allocation is used in some embodiments. The time domain resource allocation in the DCI may come in the form of an index (e.g., 4 bits) pointing into a time domain resource allocation table, which lists a set of different time domain resource allocation configurations. For instance, such a set of time domain resource allocation configurations can consist of a number of combinations of the parameters K0, S and L, where K0 is the number of slots from the received PDCCH transmission to the start of the resource allocation, S is the start OFDM symbol in the slot and L is the length of the resource allocation in number of OFDM symbols. That is, a time domain resource allocation configuration may include an indication of when in time the resource allocation starts, e.g., in terms of a number of slots ahead in time and a start OFDM symbol in the slot, and an indication of the length of the resource allocation, e.g., in terms of number of OFDM symbols. Different combinations of such indications, or values of such indications, constitute different time domain resource allocation configurations. In a standard time domain resource allocation table, 16 unique combinations may be specified.

The DCI containing the DL resource allocation for scheduling of PDSCH transmission, may be referred to as DCI format 1-0 or DCI format 1_0, may also contains a number of other parameters, e.g., related to Hybrid Automatic Repeat Request (HARQ) and Physical Uplink Control Channel (PUCCH) control, but these parameters target unicast transmissions (i.e., dedicated transmissions to a single wireless device) and may not be used in conjunction with broadcast transmissions such as paging and system information. Hence, there are a number of unused, or reserved, bits in the DL resource allocating DCI when the DL resource allocating DCI is used for paging or system information. These unused, or reserved, bits are may be referred to herein as "the reserved DCI bits".

These reserved DCI bits can be leveraged to design DL resource allocation variants that are suitable for dual beam sweep paging and/or to accommodate temporary occurrences of PDSCH sliding, as described herein. Another method that may be used for this purpose is one or more separate time domain resource allocation table(s), containing time domain resource allocation configurations suitable for dual beam sweep paging and PDSCH sliding, where unusually long scheduling gap (i.e., unusually long time—or unusually large number of slots—from the PDCCH transmission to the associated PDSCH transmission) may be used in the allocation.

Example 1: Using Reserved Bits in the DCI for Explicit Complete Time Domain Resource Allocation In this example, all or a subset of the reserved DCI bits are used for explicit time domain resource allocation, to be used instead of a time domain resource allocation in a time domain resource allocation table. As this provides the 4 DCI bits constituting the index that points into the time domain resource allocation table redundant, these 4 bits can be referred to as 4 additional reserved bits in this embodiment and may thus be part of the bits used for the explicit time domain resource allocation. Like a time domain resource allocation configuration in a time domain resource allocation table, this explicit time domain resource allocation may indicate number of slots from the received PDCCH transmission, the start OFDM symbol in the slot and/or the length of the resource allocation in umber of OFDM symbols.

One possible method for providing the time domain resource allocation is to encode slot, start symbol in the slot, and the length of the resource allocation in a single integer value (instead of, for example, using slot and start symbol separately one may also use only start symbol counted from slot 0 and numbered contiguously across slot boundaries). The granularity of each of the encoded quantities (slot, start symbol, length) could be 1 or a value larger than 1. One method for such encoding is to use a method similar to the resource indication value (RIV) encoding used in LTE for contiguous resource allocations.

Example 2: Using Reserved Bits in the DCI for Explicit Partial Time Domain Resource Allocation In this example, all or a subset of the reserved DCI bits are used for an explicit partial time domain resource allocation, replacing the corresponding partial time domain resource allocation in an associated time domain resource allocation table, i.e., overriding one or more fields. For instance, the explicit partial allocation may consist of an explicit indication of the number of slots from the PDCCH transmission to the slot in which the PDSCH DL resources are allocated. This explicit partial time domain resource allocation could then replace the above mentioned K0 in a time domain resource allocation table.

Similarly, the explicit partial time domain resource allocation could replace either the above-mentioned S or L parameter in a time domain resource allocation table or a combination of two of the K0, S and L parameters.

Hence, the explicit partial time domain resource allocation combined with the non-replaced parts of a time domain resource allocation configuration in a time domain resource allocation table (where this time domain resource allocation configuration in the time domain resource allocation table would be referenced with an index, e.g. 4 bits, in the DCI) would form a complete time domain resource allocation table.

Possibly, different time domain resource allocation tables may be used for different deployment scenarios, e.g., depending on the SCS, carrier bandwidth, number of beams in a PDCCH beam sweep and PDSCH beam sweep, time density of paging occasions, etc. The association between deployment scenario and time domain resource allocation table may be added in wireless communication standard specification(s). Alternatively, the one out of a set of different time domain resource allocation tables to be used may be configured in the system information or via dedicated signaling, e.g. RRC signaling, from the network, e.g., the gNB, to the wireless device. In another embodiment, the choice of the time domain resource allocation table to be used may be indicated using a subset of the reserved DCI bits.

As a possible option, the time domain resource allocation table(s) containing time domain resource allocation configurations that may be combined with the explicit partial time domain resource allocation may be the kind of extended time domain resource allocation table(s) described below in Example 6.

Example 3: Using Reserved Bits in the DCI for Offset(s) to be Combined with Regular Time Domain Resource Allocation Table(s)

In this example, all or a subset of the reserved DCI bits are used for an explicit offset indication/parameter. The explicit offset is added to a parameter in a time domain resource allocation table or to the PDCCH transmission/reception time. For instance, the explicit offset may be added to the previously mentioned K0 or S parameters or it may be added to the reception/transmission time of the PDCCH transmission carrying the DCI which includes the explicit offset parameter.

As an alternative, all or a subset of the reserved DCI bits could be used for multiple explicit offset indications/parameters, e.g., two explicit offset parameters. The multiple offset parameters may each be added to a different parameter in a time domain resource allocation table or to the PDCCH transmission/reception time. For instance, if two explicit offset parameters are used, one of them could be added to the K0 parameter (i.e., shifting the slot of the (start of the) DL resource allocation) while the other is added to the S parameter (i.e., shifting the start OFDM symbol in the slot for the DL allocated transmission resource).

Possibly, different time domain resource allocation tables may be used for different deployment scenarios, e.g., depending on the Subcarrier Spacing (SCS), carrier bandwidth, number of beams in a PDCCH beam sweep and PDSCH beam sweep, time density of paging occasions, etc. The association between deployment scenario and time domain resource allocation table described herein may be added in wireless communication standard specification(s). Alternatively, the one out of a set of different time domain resource allocation tables to be used may be configured in the system information or via dedicated signaling, e.g., RRC signaling, from the network, e.g. the gNB 16 or host computer 24, to the wireless device 22. In another embodiment, the choice of the time domain resource allocation table to be used may be indicated using a subset of the reserved DCI bits.

As a possible option, the time domain resource allocation table(s) containing time domain resource allocation configurations that may be combined with the explicit offset(s) may be the kind of extended time domain resource allocation table(s) described below in Example 6.

Example 4: Using Reserved Bits in the DCI for Offset(s) to be Combined with Tailored Time Domain Resource Allocation Table(s)

This example is a variation of Example 3, where the time domain resource allocation table(s) is/are adapted to or tailored for dual beam sweep paging (or other dual beam sweep broadcast transmission). Such time domain resource allocation table(s) may include configurations with longer than usual time—or a greater number of slots than usual—from the time of the transmission/reception of the PDCCH to the start of the allocated PDSCH transmission resource.

As one configuration, the adapted/tailored time domain resource allocation table(s) may include time domain resource allocation configurations which cover all the scenarios where PDSCH sliding does not occur, while the offset(s) is/are included in the DCI and added to a relevant parameter, for example, only when PDSCH sliding occurs and even longer time—or number of slots—may be needed between the PDCCH transmission/reception and the start of the allocated PDSCH transmission resource.

Possibly, different tailored time domain resource allocation tables may be used for different deployment scenarios, e.g., depending on the SCS, carrier bandwidth, number of beams in a PDCCH beam sweep and PDSCH beam sweep, time density of paging occasions, etc. The association between deployment scenario and the tailored time domain resource allocation table described herein may be added in wireless communication standard specification(s). Alternatively, the one out of a set of different tailored time domain resource allocation tables to be used may be configured (e.g., in the form of an index or a number associated with the table) in the system information or via dedicated signaling, e.g., RRC signaling, from the network, e.g., the gNB, to the wireless device. In another embodiment, a single tailored time domain resource allocation table is explicitly provided in the system information or via dedicated signaling, e.g., RRC signaling from the network to the wireless device. When a wireless device is configured with more than one table, additional signaling is needed to select the table. The choice of the tailored time domain resource allocation table to be used may be indicated using a subset of the reserved DCI bits. Alternatively, or in addition, the selection of the table could be based on the RNTI used for scrambling the DCI CRC, e.g. the P-RNTI for paging or the SI-RNTI for transmission of system information.

As a possible option, the adapted/tailored time domain resource allocation table(s) containing time domain resource allocation configurations that may be combined with the explicit offset(s) may also be the kind of extended time domain resource allocation table(s) described below in Example 6.

Example 5: Using Only Tailored Time Domain Resource Allocation Table(s)

In this example, the reserved DCI bits may not be utilized (with one optional exception where a subset of the reserved DCI bits may be used to indicate a certain tailored time domain resource allocation table). Instead, one or more time domain resource allocation table(s) are defined/configured, including time domain resource allocation configurations that are adapted, or tailored, to be suitable for dual beam sweep paging (or other dual beam sweep broadcast transmission). Time domain resource allocation table(s) may include time domain resource allocation configurations with longer than usual time—or a greater number of slots than usual—from the time of the transmission/reception of the PDCCH to the start of the allocated PDSCH transmission resource.

Different tables may be defined/configured for different deployment scenarios, e.g., depending on the SCS, carrier bandwidth, number of beams in a PDCCH beam sweep and PDSCH beam sweep, time density of paging occasions, etc. The association between deployment scenario and time domain resource allocation table described herein may be added to in wireless communication standard specification(s). Alternatively, the one out of a set of different time domain resource allocation tables to be used may be configured (e.g., in the form of an index or a number associated with the table) in the system information or via dedicated signaling, e.g., RRC signaling, from the network, e.g., the gNB 16 or host computer 24, to the wireless device. Another alternative is that a single tailored time domain resource allocation table is explicitly provided in the system information or via dedicated signaling, e.g., RRC signaling from the network to the wireless device. When a wireless device 22 is configured with more than one table, additional signaling is needed to select the table. The choice of the time domain resource allocation table to be used may be indicated using a subset of the reserved bits (in which case some of the reserved DCI bits are in some sense utilized). Alternatively, or in addition, the selection of the table could be based on the RNTI used for scrambling the DCI CRC, e.g. the P-RNTI for paging or the SI-RNTI for transmission of system information.

Example 6: Using Extended Time Domain Resource Allocation Table(s) and Extended Indexes In this example, the time domain resource allocation table used in conjunction with dual beam sweep paging is extended with an additional set of time domain resource allocation configurations, wherein the additional time domain resource allocation configurations are adapted/tailored for dual beam sweep paging (or other dual beam sweep broadcast transmission).

To allow for referencing of any of the time domain resource allocation configurations in the extended table from the DCI, the index in the DCI used for pointing into the table may be extended with one or more bits. This or these additional index bit(s) is/are taken from the reserved DCI bits.

Different extended time domain resource allocation tables may be defined/configured for different deployment scenarios, e.g., depending on the SCS, carrier bandwidth, number of beams in a PDCCH beam sweep and PDSCH beam sweep, time density of paging occasions, etc. The association between deployment scenario and extended time domain resource allocation table may be added or specified in wireless communication standard specification(s). Alternatively, the one out of a set of different extended time domain resource allocation tables to be used may be configured (e.g., in the form of an index or a number associated with the table) in the system information or via dedicated signaling, e.g., RRC signaling, from the network, e.g., the gNB 16 or host computer 24, to the wireless device 22. Another alternative is that a single extended time domain resource allocation table is explicitly provided in the system information or via dedicated signaling, e.g., RRC signaling from the network to the wireless device. Yet alternatively, the choice of the time domain resource allocation table to be used may be indicated using a subset of the reserved bits.

Example 6 may be combined with Examples 2, 3 or 4, where other combinations may be possible in light to the teachings of the disclosure.

Some example embodiments are provided as follows:

Embodiment A1

A network node 16 configured to communicate with a wireless device 22, the network node 16 configured to, and/or comprising a radio interface 62 and/or comprising processing circuitry 68 configured to:

before performing a Physical Downlink Control Channel, PDCCH, beam sweep, signal a scheduling of a Physical Downlink Shared Channel, PDSCH, beam sweep associated with the PDCCH beam sweep.

Embodiment A2

The network node 16 of Embodiment A1, wherein the signaling of the PDSCH beam sweep includes using at least one Downlink Control Information, DCI, bit for indicating a time domain resource allocation for paging.

Embodiment A3

The network node 16 of Embodiment A1, wherein the signaling of the PDSCH beam sweep occurs a time duration before the PDCCH beam sweep, where the time duration is equal to or greater than the duration of the PDCCH beam sweep.

Embodiment B1

A method implemented in a network node 16, the method comprising:

before performing a Physical Downlink Control Channel, PDCCH, beam sweep, signaling a scheduling of a Physical Downlink Shared Channel, PDSCH, beam sweep associated with the PDCCH beam sweep.

Embodiment B2

The method of Embodiment C1, where the signaling of the PDSCH beam sweep includes using at least one Downlink Control Information, DCI, bit for indicating a time domain resource allocation for paging.

Embodiment B3

The method of Embodiment C1, wherein the signaling of the PDSCH beam sweep occurs a time duration before the PDCCH beam sweep, where the time duration is equal to or greater than the duration of the PDCCH beam sweep.

Embodiment C1

A wireless device 22 configured to communicate with a network node 16, the wireless device 22 configured to, and/or comprising a radio interface 62 and/or processing circuitry 68 configured to:

before receiving a Physical Downlink Control Channel, PDCCH, beam sweep, receiving a signaling of a scheduling of a Physical Downlink Shared Channel, PDSCH, beam sweep associated with the PDCCH beam sweep; and processing the signaling of the scheduling for receiving the PDSCH beam sweep.

Embodiment C2

The wireless device 22 of Embodiment C1, wherein the signaling of the scheduling of the PDSCH beam sweep includes using at least one Downlink Control Information, DCI, bit for indicating a time domain resource allocation of paging.

Embodiment C3

The wireless device 22 of Embodiment C1, wherein the signaling of the scheduling of the PDSCH beam sweep occurs a time duration before the PDCCH beam sweep, where the time duration is equal to or greater than the duration of the PDCCH beam sweep.

Embodiment D1

A method implemented in a wireless device 22, the method comprising:
before receiving a Physical Downlink Control Channel, PDCCH, beam sweep, receiving a signaling of a scheduling of a Physical Downlink Shared Channel, PDSCH, beam sweep associated with the PDCCH beam sweep; and
processing the signaling of the scheduling for receiving the PDSCH beam sweep.

Embodiment D2

The method of Embodiment D1, wherein the signaling of the scheduling of the PDSCH beam sweep includes using at least one Downlink Control Information, DCI, bit for indicating a time domain resource allocation for paging.

Embodiment D3

The method of Embodiment D1, wherein the signaling of the scheduling of the PDSCH beam sweep occurs a time duration before the PDCCH beam sweep, where the time duration is equal to or greater than the duration of the PDCCH beam sweep.

Therefore, the teachings of the disclosure advantageously provide time domain resource allocations for dual beam sweep paging (or other dual beam sweep broadcast transmission), even when a large number of beams (e.g., 64) are used. Reserved bits in the DCI for DL resource allocation are utilized to provide explicit partial or complete time domain resource allocation (to replace or be combined with the time domain resource allocation in a time domain resource allocation table) or parameter(s) to be combined with (e.g., by adding an offset) a time domain resource allocation configuration in a time domain resource allocation table.

In other embodiments, the time domain resource allocation table used in conjunction with dual beam sweep paging (or other dual beam sweep broadcast transmission) is adapted/tailored for dual beam sweep paging (or other dual beam sweep broadcast transmission) in terms of inclusion of time domain resource allocation configurations with unusually long scheduling gap (i.e. unusually long time—or unusually large number of slots—from the PDCCH transmission to the associated PDSCH transmission). The adapted/tailored time domain resource allocation table may be of regular (e.g., predefined as in a standard) size or may be extended with time domain resource allocation configurations adapted/tailored for allocations far ahead in time in conjunction with dual beam sweep paging (or other dual beam sweep broadcast transmission).

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware.

Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

For example, the concepts and variants are partially described in the context of Long Term Evolution (LTE) or LTE-Advanced (LTE-A) or Next Radio mobile or wireless communications technologies; however, this does not rule out the use of the present concepts and aspects in connection with additional or alternative mobile communication technologies such as the Global System for Mobile Communications (GSM). While the following variants will partially be described with respect to certain Technical Specifications (TSs) of the Third Generation Partnership Project (3GPP), it will be appreciated that the present concepts and aspects could also be realized in connection with different Performance Management (PM) specifications.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:
Abbreviation Explanation
3GPP $3^{rd}$ Generation Partnership Project
5G $5^{th}$ Generation
CMAS Commercial Mobile Alert System
CN Core Network
CRC Cyclic Redundancy Check
DCI Downlink Control Information
DL Downlink
DRX Discontinuous Reception
eNB Evolved NodeB
ETWS Earthquake and Tsunami Warning System
FR1 Frequency Range 1 (450-6000 MHz)
FR2 Frequency Range 2 (24250-52600 MHz)
gNB The term for a radio base station in NR (corresponding to eNB in LTE).
HARQ Hybrid Automatic Repeat Request
ID Identity/Identifier
IMSI International Mobile Subscriber Identity
I-RNTI Inactive RNTI
LTE Long Term Evolution
NG-RAN Next Generation Radio Access Network
NR New Radio (The term used for the 5G radio interface and radio access network in the technical reports and standard specifications the 3GPP is working on. Another term for 3GPP's 5G radio access network is NG-RAN.)
OFDM Orthogonal Frequency Division Multiplex
PDCCH Physical Downlink Control Channel
PDSCH Physical Downlink Shared Channel
PO Paging Occasion
P-RNTI Paging RNTI
PUCCH Physical Uplink Control Channel
RAN Radio Access Network
RIV Resource Indication Value
RNTI Radio Network Temporary Identifier
RRC Radio Resource Control
SCS Subcarrier Spacing
SFN Single Frequency Network
SI-RNTI System Information RNTI
S-TMSI S-Temporary Mobile Subscriber Identity
TDD Time-Division Duplex
TMSI Temporary Mobile Subscriber Identity
TRP Transmission/Reception Point
UE User Equipment
URLLC Ultra-Reliable, Low-Latency Communications It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A network node for performing dual beam sweep, the dual beam sweep including a physical downlink control channel (PDCCH) beam sweep and a corresponding physical downlink shared channel (PDSCH) beam sweep that are separated in time to each other, the network node comprising processing circuitry configured to:
    indicate, in a PDCCH transmission within the PDCCH beam sweep, a time domain resource allocation for the corresponding PDSCH beam, the time domain resource allocation corresponding to an offset in time slots between the PDCCH beam and the corresponding PDSCH beam, the offset being one of a plurality of offsets that can be indicated for the corresponding PDSCH beam; and
    perform the dual beam sweep using at least in part the indication.

2. The network node of claim 1, wherein the time domain resource allocation comprises a plurality of time domain resource configurations and wherein each of the plurality of time domain resource allocations comprises an offset.

3. The network node of claim 1, further configured to determine to use an extended time resource allocation, wherein the indication indicates a time resource allocation from an extended time domain resource allocation which comprises the plurality of offsets being greater than a standard number of offsets, and wherein the standard number of offsets and/or time domain resource configurations is 16, and/or wherein the determining is based on a paging load.

4. The network node of claim 1, wherein the indication is provided at least in part by downlink control information (DCI) in the PDCCH transmission within the PDCCH beam sweep.

5. The network node of claim 1, wherein the indication is provided at least in part by at least one bit in downlink control information (DCI) reserved for a redundancy functionality.

6. The network node of claim 1, wherein the offset is equal to or greater than a duration of the PDCCH beam sweep, and/or wherein the offset corresponds to at least 32 time slots.

7. The network node of claim 1, wherein the indication corresponds to an index pointing into a resource allocation table and at least one bit for one of replacing and modifying a parameter in the resource allocation table.

8. The network node of claim 1, wherein the indication corresponds to:
    a plurality of bits in downlink control information (DCI) configured to indicate an index pointing into a resource allocation table; and
    at least one other bit in the DCI configured to extend a bit length of the index.

9. The network node of claim 1, wherein the dual beam sweep corresponds to a dual beam sweep broadcast transmission; and the indication of the time domain resource allocation being provided at least in part by at least one bit, in the PDCCH, associated with unicast transmission.

10. A wireless device for communicating with a network node configured to perform dual beam sweeps including a physical downlink control channel (PDCCH) beam sweep and a corresponding physical downlink shared channel (PDSCH) beam sweep that are non-adjacent in time to each other, the wireless device comprising processing circuitry configured to:
  receive, in a PDCCH transmission within the PDCCH beam sweep, an indication of a time domain resource allocation for the corresponding PDSCH beam, the time domain resource allocation corresponding to an offset in time slots between the PDCCH beam and the corresponding PDSCH beam, the offset being one of a plurality of offsets that can be indicated for the corresponding PDSCH beam; and
  receive the PDSCH beam of the dual beam sweep based at least in part on the time domain resource allocation.

11. The wireless device of claim 10, wherein the time domain resource allocation comprises a plurality of time domain resource configurations and wherein each of the plurality of time domain resource allocations comprises an offset.

12. The wireless device of claim 10, wherein the indication indicates a time resource allocation from an extended time domain resource allocation which comprises the plurality of offsets being greater than a standard number of offsets, and wherein the standard number of offsets and/or time domain resource configurations is 16.

13. The wireless device of claim 10, wherein the indication is provided at least in part by downlink control information (DCI) in the PDCCH transmission within the PDCCH beam sweep.

14. The wireless device of claim 10, wherein the indication is provided at least in part by at least one bit in downlink control information (DCI) reserved for a redundancy functionality.

15. The wireless device of claim 10, wherein the offset is equal to or greater than a duration of the PDCCH beam sweep, and/or wherein the offset corresponds to at least 32 time slots.

16. The wireless device of claim 10, wherein the indication corresponds to an index pointing into a resource allocation table and at least one bit for one of replacing and modifying a parameter in the resource allocation table.

17. The wireless device of claim 10, wherein the indication corresponds to:
  a plurality of bits in downlink control information (DCI) configured to indicate an index pointing into a resource allocation table; and
  at least one other bit in the DCI configured to extend a bit length of the index.

18. The wireless device of claim 10, wherein the dual beam sweep corresponds to a dual beam sweep broadcast transmission; and
  the indication of the time domain resource allocation being provided at least in part by at least one bit, in the PDCCH, associated with unicast transmission.

19. A method implemented in a network node for performing dual beam sweep, the dual beam sweep including a physical downlink control channel (PDCCH) beam sweep and a corresponding physical downlink shared channel (PDSCH) beam sweep that are separated in time to each other, the method comprising:
  indicating, in a PDCCH transmission within the PDCCH beam sweep, a time domain resource allocation for the corresponding PDSCH beam, the time domain resource allocation corresponding to an offset in time slots between the PDCCH beam and the corresponding PDSCH beam, the offset being one of a plurality of offsets that can be indicated for the corresponding PDSCH beam; and
  performing the dual beam sweep using at least in part the indication.

20. A method implemented in a wireless device for communicating with a network node configured to perform dual beam sweeps including a physical downlink control channel (PDCCH) beam sweep and a corresponding physical downlink shared channel (PDSCH) beam sweep that are non-adjacent in time to each other, the method comprising:
  receiving, in a PDCCH transmission within the PDCCH beam sweep, a time domain resource allocation for the corresponding PDSCH beam, the time domain resource allocation corresponding to an offset in time slots between the PDCCH beam and the corresponding PDSCH beam, the offset being one of a plurality of offsets that can be indicated for the corresponding PDSCH beam; and
  receiving the PDSCH beam of the dual beam sweep based at least in part on the time domain resource allocation.

* * * * *